United States Patent [19]

Petrow et al.

[11] 3,933,684

[45] Jan. 20, 1976

[54] METHOD OF FORMING PALLADIUM OXIDE AND PALLADIUM PARTICLES

[75] Inventors: Henry G. Petrow, Cambridge; Robert J. Allen, Saugus, both of Mass.

[73] Assignee: Prototech Company, Newton Highlands, Mass.

[22] Filed: Sept. 7, 1973

[21] Appl. No.: 395,182

Related U.S. Application Data

[63] Continuation of Ser. No. 215,149, Jan. 3, 1972, abandoned.

[52] U.S. Cl. ............................................. 252/447
[51] Int. Cl.[2] ...................................... B01J 21/18
[58] Field of Search ................ 252/447; 75/22, 102

[56] References Cited
UNITED STATES PATENTS

| | | | |
|---|---|---|---|
| 2,283,198 | 5/1942 | Fink et al. | 75/102 |
| 3,291,753 | 12/1966 | Thompson | 252/447 |
| 3,437,431 | 4/1969 | Platz | 423/22 |
| 3,629,145 | 12/1971 | Morikawa et al. | 252/447 |
| 3,804,779 | 4/1974 | Kent et al. | 252/447 |

*Primary Examiner*—T. Tung
*Assistant Examiner*—H. A. Feeley
*Attorney, Agent, or Firm*—Rines and Rines; Shapiro and Shapiro

[57] ABSTRACT

This disclosure deals with a novel catalytic structure embodying palladium metal particles (and in some instances palladium and gold metal particles) in the approximately 20–40 Angstrom size range on high surface area substrates useful as electrochemical cell electrodes, oxidation process catalysts and the like, and preferably formed from a colloidal sol of corresponding palladium oxide (and gold oxide) particles which are reduced on the substrate to the metal.

4 Claims, No Drawings

METHOD OF FORMING PALLADIUM OXIDE AND PALLADIUM PARTICLES

This is a continuation application of Ser. No. 215,149, filed Jan. 3, 1972 now abandoned.

The present invention relates to catalytic structures and methods of forming the same, being more particularly directed to high-surface-area palladium adsorbed onto a substrate, with and without similarly adsorbed gold, and methods of preparing the same, useful for electrochemical cell electrode and similar uses, oxidation processes, and other well-known similar uses, all hereinafter generically embraced by the terms "catalytic" or "catalyst."

The use of palladium as an electrochemical catalytic electrode, such as a fuel cell anode or the like, has been well known, as described, for example, in "A Hydrocarbon-Air Fuel Cell with Molten Alkali-Hydroxide Electrolyte" Walter Juda, Henry G. Petrow, Robert L. Novak, Robert J. Allen, David M. Moulton et al., Proceedings of the Electrochemical Society, October, 1968, Montreal, Canada, p. 183, paper 353, wherein use is made of the hydrogen-gas-pervious properties of solid layers or sheets of palladium. The problems of providing porous catalytic palladium structures, such as electrodes for fuel cells or the like, however, have involved difficulties in the production of large surface areas and of tenacious deposits upon appropriate substrates; and it is more particularly to these problems that the present invention, in one of its important aspects, is directed. It has been extremely difficult, for example, to deposit palladium in extremely fine and strongly adherent particles to create a large surface area structure. In addition, palladium has been known unsatisfactorily to corrode in fuel cell operation and the like upon loss of protective hydrogen fuel.

It is an object of the invention, accordingly, to provide a new and improved high-surface-area palladium catalytic structure strongly adsorbed upon appropriate rough or porous substrate and resistant to corrosive influences, and to provide novel methods of forming the same.

Another object is to provide a novel combined palladium and gold catalytic structure and method useful for fuel cell oxidation, and other catalytic applications.

A further object is to provide such novel structures of more general catalytic usage, as well.

Still another object is to provide new methods of preparation of sols from which such structures may be made.

Other and further objects will be explained hereinafter and are more particularly defined in the appended claims. In summary, however, from one of its broader aspects, the invention contemplates palladium particles (in some instances combined with similar gold particles) of substantially 20-40 Angstroms particle size adsorbed to an appropriate substrate, preferably by the reduction of a $NO_2$-free and chloride-free palladium oxide colloid sol. Preferred details are hereinafter explained.

Referring first to the illustrative application to electrochemical cell operation (though the invention is of broader utility, as previously and hereinafter explained), porous catalytic electrodes have important application as anode structures in phosphoric acid fuel cells and other cells, as of the type described in "A High-Performance Fuel Cell Employing Conduction-PorousTeflon Electrodes and Liquid Electrolytes," L. W. Niedrach et al, Journal of Electrochemical Society, Vol. 112, Feb., 1965, p. 117–124. In such cells, carbon monoxide, produced when natural gas or other hydrocarbons are reformed to make the hydrogen fuel, is known to poison catalytic anode surfaces; and organics and other corrosive materials from the various cell components have similarly deleteriously affected the electrode life.

In accordance with a discovery underlying the present invention, it has been found that if small palladium particles in the approximately 20–40 Angstrom particle size range can be strongly adhered to a porous carbon or similar rough substrate, not only is an extremely high surface area palladium catalytic anode provided, but the small particulate form is remarkably tolerant to both carbon monoxide and such organics and corrosive materials from the cell components. More than this, a remarkable resistance to corrosion, even if the protection of the hydrogen fuel is lost and even at temperatures up to 160°C, over a substantial period of time, has surprisingly been found to be produced by such structures, contrary to the experience with prior palladium electrodes.

It is perhaps first in order to describe how the palladium catalytic structure is preferably formed.

Palladium metal, which is normally difficultly soluble in concentrated nitric acid, has been found to be violently dissolvable upon the adding to the nitric acid of a trace of bromine ions, such as through HBr. While palladium could have been dissolved in aqua regia, the stability of the colloidal sol of the invention (from which the particulated palladium is adsorbed upon the porous or rough substrate) requires absence of chloride ions. Since residual $NO_2$ is also undesirable, the nitric acid that has dissolved the palladium is reflux-boiled to remove all traces of $NO_2$ and to concentrate the solution. The concentrated solution is then diluted with water and contacted with a water-immiscible high-molecular weight amine, such as the tertiary octyl amine Alamine 336 of General Mills Chemical Company, to bring the pH of the aqueous phase to about 3.0. The aqueous palladium oxide, with some palladium oxide precipitate, is separated and filtered to remove such precipitate. It has been determined by the O'Connor technique (described at "Fabrication of Monodisperse Lucite and Iron Oxide Particles With A Spinning Disc Generator," R. E. Albert, Henry G. Petrow et al, Health Physics, Vol. 10, pp. 933–940, 1964) that the resulting colloidal particles of the intensely brown palladium oxide in this sol are substantially in the 20–40 Angstrom particle size range. This sol is adsorbed upon a suitable substrate, such as porous carbon for electrode application (for example, Norit A high-surface area carbon black), and is reduced, as with hydrazine, to yield palladium metal particles of substantially the same size range, tenaciously adsorbed on the substrate.

An example follows of the efficacy of a catalytic structure so prepared and used as a porous hydrogen anode, one inch square, in a 135°C phosphoric acid fuel cell employing a similarly dimensional platinum air cathode. The Norit A carbon substrate anode containing the adsorbed palladium particles above-discussed in a loading of about ½ milligram/$cm^2$, was found to be remarkably tolerant to CO in the hydrogen fuel, providing only about 20 millivolt drop in cell voltage at 100 amperes per square foot current in operation when as much as 1.6 percent (by volume) of CO was present in the hydrogen fuel, reformed from natural gas, and as compared with pure hydrogen fuel operation. No significant decay with time was noted.

It was found that if an equivalent amount of platinum (by cost) were used on the anode and operated under the same conditions, an initial 200 millivolts of loss caused by CO poisoning is rapidly produced, with as much as another 100 millivolts being lost over time because of platinum poisoning from the organics, etc., of the cell components.

And even if the platinum and palladium loading of the equivalent catalytic anodes is made exactly the same and the cell is operated under the same conditions, the platinum anode, as distinguished from the palladium anode of the invention, produced a large 30–50 millivolts initial CO-poisoning loss, which increased with time, the operational characteristics decaying in performance.

More than this, despite prior experience in the art with the highly corrosive action of phosphoric acid, under heat, upon palladium that is not protected by a hydrogen layer, it has been surprisingly found that the particulate form of palladium anode above-described exhibits unusual properties. Whereas the prior art considered it necessary to alloy the palladium with, for example, gold to prevent this corrosion, and the resulting poorer catalytic activity of such alloying had to be put up with, this is not required with the structure of the invention for this particular purpose, though, as later explained, the combined use of gold may also be desirable. If the fuel cell is continued "on load" but the hydrogen fuel is lost, for example, it has been discovered that the catalytic particulate palladium anode structures of the invention still resists the phosphoric acid, such that the cell only suffers about 5 millivolts of loss of performance over even as much as an hour of continued operation. If the output circuit is opened, moreover, and the hydrogen fuel input is again lost, it has been found that no detectable loss in cell performance occurs even after 24 hours of such operation; again attesting to the unusual properties of the catalytic structure of the invention.

Another important catalytic application of the particulated palladium-adsorbed substrate of the invention, enabling far less costly structures than if platinum had to be used, resides, for example, in its use on rough insulating asbestos or the like and on conductive metal strips or screen substrate, etc., to oxidize solvents in commercial processes, such as methyl ethyl ketone and the like, or to oxidize grease from cooking or other high-temperature solvent, carbon or similar effluents.

In connection with the use of the structures of the invention as oxidation process catalysts, typical results include the following. Using high surface area alumina pellets as a substrate, catalysts of identical palladium content were prepared; in one case, by adsorbing the palladium oxide sol of the invention on the pellets, and in the other case, by adsorbing a solution of palladium nitrate onto the pellets. The oxidation catalyst performance was then compared for the air oxidation of methane and benzene. For such catalysts containing 0.1% by weight of palladium, the catalyst prepared from the sol of the invention produced ignition temperatures for benzene approximately 30°C lower than those obtained using the catalyst prepared from palladium nitrate. In the case of the oxidation of methane the catalyst prepared from the sol of the invention was superior in ignition temperatures by about 40°C.

It has been found, furthermore, that the simultaneous use of both the colloidal palladium and colloidal gold, both in the oxide form, provides even a greater measure of performance, particularly as hydrogen anode or other electrode structures in the before mentioned fuel cells and the like.

In a fuel cell as before-described, operating with a hydrogen fuel containing carbon monoxide, (such as 80% hydrogen, 1.6% carbon monoxide, with the remainder being carbon dioxide) and with a loading of palladium adsorbed on carbon of 0.5 milligram per square centimeter, typical performance at 135°C with a platinum cathode produces about 100 asf (amperes per square foot) at approximately 670 millivolts. If, however, gold is added in the colloidal form before-mentioned, to the catalyst structure in a substantially equal amount to that of palladium present, namely, about 0.5 milligram per square centimeter, typical performance at 135°C and at 100 asf will be considerably increased to the order of 730 millivolts. This improvement becomes even more apparent for high current densities. For example, at 500 asf, the gold-palladium mixture of the invention is superior to palladium alone by about 100 millivolts. This, in turn, is superior to platinum by about 250 millivolts, when the platinum loading is .25 milligrams per square centimeter, the equivalent in cost to the one milligram total gold and palladium loading; and the gold-palladium mixture is far more suitable than platinum at the higher current densities where much more deterioration in performance of the latter was noted.

For example, one such fuel cell was operated for over 3200 hours without the gold-palladium anode of the invention showing any detectable deterioriation whatsoever.

The gold oxide colloidal particles in this mixture are of the same size range as the before-described palladium particles; and it has been found, as before explained, that to be effective as described, the gold must be applied to the substrate in this colloidal oxide form. Where, indeed, the gold was merely adsorbed on the carbon substrate from either chloroauric acid or sodium chloroaurate, the performance in the presence of palladium was identical to anodes prepared from palladium containing no gold whatsoever. The surprising result of the marked enhancement derived from the use of colloidal gold as above-described, moreover, resides further in the fact that, when applied as such a gold colloid, the gold itself appears to exhibit no anode activity whatsoever in the phosphoric acid electrolyte of the cell. furthermore X-ray diffraction studies demonstrate that there is no alloy formation from co-mingling of gold and palladium.

The colloidal gold oxide of the invention is preferably prepared and applied as follows. Two thousandths of a mol of chloroauric acid is dissolved in about 900 cc of water. To this is added 0.008 mol sodium hydroxide, as one molar sodium hydroxide solution, while stirring. The mixture is then allowed to stand approximately 48 hours during which period the solution changes color from bright yellow to a clear wine-red colloidal dispersion of gold oxide, exhibiting typical properties of colloids, such as flocculation upon prolonged heating or the addition of strong electrolyte such as sodium nitrate.

If the before-mentioned type of high surface carbon substrate such as Norit A, is employed, the colloidal gold is added thereto typically in the ratio of 50 grams of Norit A for 4 grams of colloidal gold. Following adsorption of the gold, the mixture is filtered, washed and redispersed in water. Sufficient colloidal palladium oxide sol (of typical concentration 5 grams palladium per liter) is then added to provide a total of about 4 grams of palladium particles adsorbed by the Norit A. This mixture is then reduced with hydrazine to yield gold and palladium metals; and the product is then filtered, washed and dried at 150°C, being then usable as the catalytic material for forming the electrode, with the improved results before recounted.

Further uses and modifications will also occur to those skilled in this art, and all such are considered to fall within the spirit and scope of the invention as defined in the appended claims.

What is claimed is:

1. A method of forming a particulated catalytic structure, that comprises, contacting a substantially $NO_2$ free — substituted therefor aqueous solution of palladium dissolved in concentrated chloride-free nitric acid with a water-immiscible high molecular weight amine in amount sufficient to bring the pH of the aqueous phase to substantially 3.0 and extracting the aqueous phase, thereby producing an aqueous colloidal sol of palladium oxide particles substantially in the range of 20–40 A in particle size.

2. A method as claimed in claim 1 and in which said aqueous phase is adsorbed on a high surface area substrate and is reduced to yield corresponding palladium metal particles adhered to the substrate.

3. A method as claimed in claim 2 and in which a colloidal sol of gold oxide particles is further adsorbed and reduced upon said substrate.

4. A method as claimed in claim 2 and in which said palladium solution is formed by adding palladium metal to concentrated nitric acid in which said metal is normally difficulty soluble, and catalytically effecting violent dissolution of the palladium by adding a trace of bromine ions as from HBr.

* * * * *